(12) United States Patent
Capps (10) Patent No.: US 7,017,117 B2
(45) Date of Patent: Mar. 21, 2006

(54) ATTENUATING AND AMPLIFYING USER INTERFACE THEMES

(75) Inventor: Stephen P Capps, San Carlos, CA (US)

(73) Assignee: Symantec Corporation, Cupertino, CA (US)

( * ) Notice: Subject to any disclaimer, the term of this patent is extended or adjusted under 35 U.S.C. 154(b) by 0 days.

(21) Appl. No.: 10/367,451

(22) Filed: Feb. 13, 2003

(65) Prior Publication Data

US 2003/0174164 A1     Sep. 18, 2003

Related U.S. Application Data

(60) Provisional application No. 60/356,589, filed on Feb. 14, 2002.

(51) Int. Cl.
   *G06F 3/00*     (2006.01)
(52) U.S. Cl. .................................. 715/767; 715/765
(58) Field of Classification Search ............... 345/764, 345/744–747, 760, 768, 765, 553, 767, 769, 345/213, 840, 841, 846; 715/765, 553, 767, 715/769, 840, 841, 846
   See application file for complete search history.

(56) References Cited

U.S. PATENT DOCUMENTS

| | | | |
|---|---|---|---|
| 5,987,525 A | 11/1999 | Roberts et al. | |
| 6,091,411 A * | 7/2000 | Straub et al. | 345/747 |
| 6,104,391 A * | 8/2000 | Johnston et al. | 345/745 |
| 6,154,773 A | 11/2000 | Roberts et al. | |
| 6,256,032 B1 | 7/2001 | Hugh | |
| 6,392,671 B1 * | 5/2002 | Glaser | 345/765 |
| 6,677,962 B1 * | 1/2004 | Bailey | 345/744 |
| 6,762,767 B1 * | 7/2004 | Evans et al. | 345/581 |
| 6,791,581 B1 * | 9/2004 | Novak et al. | 345/744 |

OTHER PUBLICATIONS

PocketThemes.com web pages describing products and services indicating dates from 2002 [online]. PcketThemes.com [retrieved Jun. 9, 2003]. Retrieved from the Internet <URL: http://www.pocketthemes.com>.

Webshots.com web pages describing products and services indicating dates from 1995 [online]. Webshots.com [retrieved Jun. 9, 2003]. Retrieved from the Internet <URL: http://www.webshots.com>.

* cited by examiner

*Primary Examiner*—Kristine Kincaid
*Assistant Examiner*—Le Nguyen
(74) *Attorney, Agent, or Firm*—Sonnenschein Nath & Rosenthal LLP (57) ABSTRACT

The degree to which a theme is applied to a graphical computer operating environment is modified. Elements of the graphical computer operating environment are displayed according to an applied theme and a specified theme intensity level. A new theme intensity level is received and the display of the elements of the graphical computer operating environment are modified accordingly. The modification of the elements of the graphical computer operating environment can comprise attenuation or amplification.

30 Claims, 9 Drawing Sheets

ATTENUATING AND AMPLIFYING USER INTERFACE THEMES

CROSS-REFERENCE TO RELATED APPLICATIONS

This application claims priority under 35 U.S.C. § 119(e) from U.S. Provisional Patent Application Ser. No. 60/356,589, filed Feb. 14, 2002, the entirety of which is incorporated herein by reference. This application is related to co-pending U.S. patent application Ser. No. 10/367,338, titled "Dynamic Graphical Computer Operating Environment, with Automatically Updated Themes," filed Feb. 13, 2003 and having the same assignee.

BACKGROUND

1. Field of Invention

The present invention relates generally to computing device user interfaces, and specifically to the attenuation and amplification of user interface themes.

2. Background of Invention

Some modern computing devices have a user interface that supports themes (sometimes called "skins"). A theme generally comprises a collection of related graphical images, color palettes, sounds, or other elements that a user can download and "wrap" around their device's user interface. In other words, a theme is an image or series of related images that allow users to customize the look and behavior of their computing device's user interface. Users often obtain these skins by downloading them from the Internet and installing them manually on their computers. For example, themes for Personal Digital Assistants (PDAs) are available from web sites such as http://www.pocketthemes.com/.

Once a user installs a theme on his device, he has little or no control over the behavior of that theme. A theme might use animations, sound effects, or bright colors. Although a user may enjoy these features when engaged in recreational computing, all of these potentially can distract the user, particularly when he is performing more serious work. If a theme proves to be too distracting, the only solution is for the user to remove the theme, disable the theme, or switch to a different theme. If the user subsequently wishes to reactivate the theme later, he must reinstall or reenable it. Frequent installation and removal of themes is inconvenient, awkward, and labor intensive. Accordingly, there exists a need for a method and system for attenuating and amplifying user interface themes.

SUMMARY OF INVENTION

The present invention provides a way for the user to attenuate or amplify a theme that he has installed on his device with a "theme volume control" or TVC for short. Themes may be quite animated and colorful. A user's tolerance for distraction varies. When using a device for entertainment, a user's tolerance for distraction may be higher. When using a device for academic or business work, a user's tolerance for distraction may be lower. The present invention enables a user to match a theme on a device to his tolerance level. The user can "turn down" the TVC, which could stop animations, mute colors, or stop other distractions. The user can also "turn up" the TVC, which could increase the frequency and range of animations, brighten the colors, or vary colors over time.

One embodiment of the present invention comprises a device with one or more applications, a rendering system, one or more themes, and a TVC. An application presents its data and functionality to the user through a user interface. To make a user interface, the application creates a set of user interface elements. The rendering system combines this set of elements with a theme to render to the display. The rendering system uses the current TVC level to attenuate or amplify the rendition to reflect the user's selected tolerance for distraction.

The features and advantages described in this summary and the following detailed description are not all-inclusive, and particularly, many additional features and advantages will be apparent to one of ordinary skill in the art in view of the drawings, specification, and claims hereof. Moreover, it should be noted that the language used in the specification has been principally selected for readability and instructional purposes and may not have been selected to delineate or circumscribe the inventive subject matter, resort to the claims being necessary to determine such inventive subject matter.

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
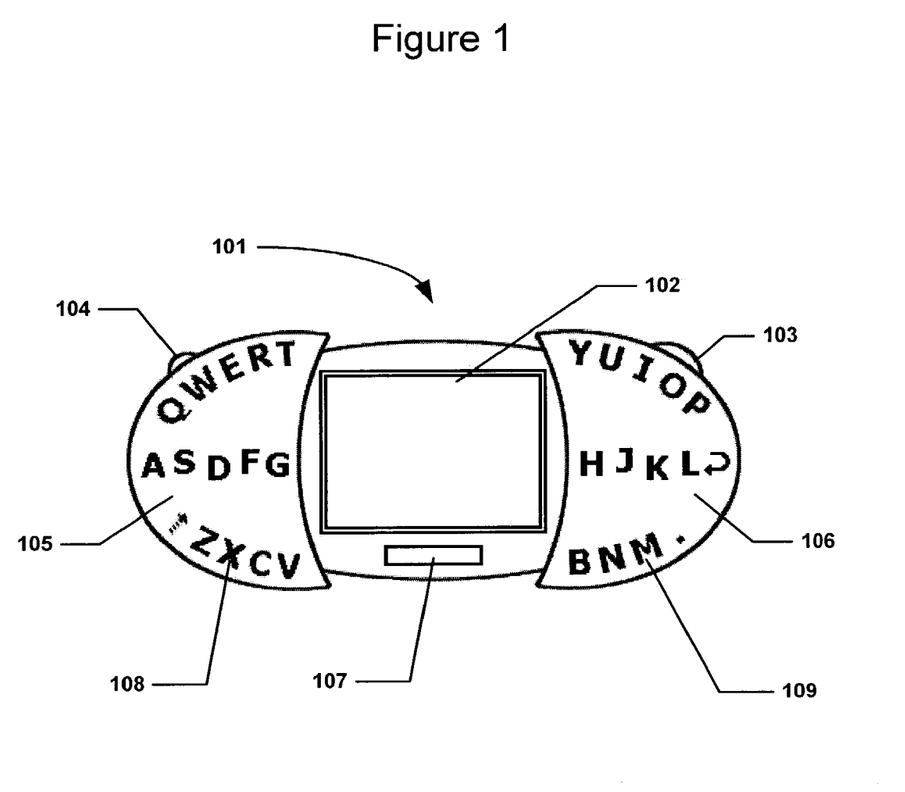
FIG. 1 is a diagram of a portable communication device, according to one embodiment of the present invention.

FIG. 1 is a diagram of a portable communication device 101, to be used in conjunction with some embodiments of the present invention. The device 101 has an LCD display 102 (or other display type). The device 101 also has a jog wheel 103, an escape button 104, and a space bar 107. In some embodiments, the device 101 has more, fewer, or similar input devices, as desired. The device 101 also has a simplified QWERTY keyboard divided into two portions, portions 105 and 106. In other embodiments, keyboard layouts other than QWERTY can be used. Keyboard portion 105 is located on the left side of the device 101 and contains buttons 108 labeled with half (or about half) of the textual legends of a simplified QWERTY keyboard. For example, the first row of the left portion 105 of the simplified QWERTY keyboard can contain buttons 108 labeled "QWERT." Keyboard portion 106 is located on the right side of the device 101 and contains buttons 109 labeled with the remaining textual legends of a simplified QWERTY keyboard.

The jog wheel 103 (or similar input device) can be used to scroll the contents of the display 102 and move the position of the current selection; pressing the jog wheel 103 as a button can also invoke an operation in a fashion similar to pressing a button on a mouse. Selecting a name from a list of phone numbers is a pertinent example: the device user rolls the jog wheel 103 down to move the selection to a desired appropriate name. The list of names may scroll off the top of the display 102 if the name is at the bottom of the list. Once the desired name is highlighted, the user presses the jog wheel 103 to select commands for that name. The user can roll the jog wheel 103 to move the selection to the desired name. Once the desired name is highlighted, the user can press the jog wheel 103 to select commands for that name. A secondary screen, often a menu, may then be shown. The escape button 104 can be used to cancel the operation and go back to the previous screen. Textual input can be entered on the device 101 by using the buttons of keyboard portions 105 and 106, and by using the space bar 107.

As illustrated and explained below, some embodiments of the present invention can be instantiated on devices 101 such as the one illustrated in FIG. 1. It is to be understood that the present invention can also be instantiated on other types of portable and non-portable computing devices, such as cell phones or laptop and desktop personal computers.

Figure 2A:
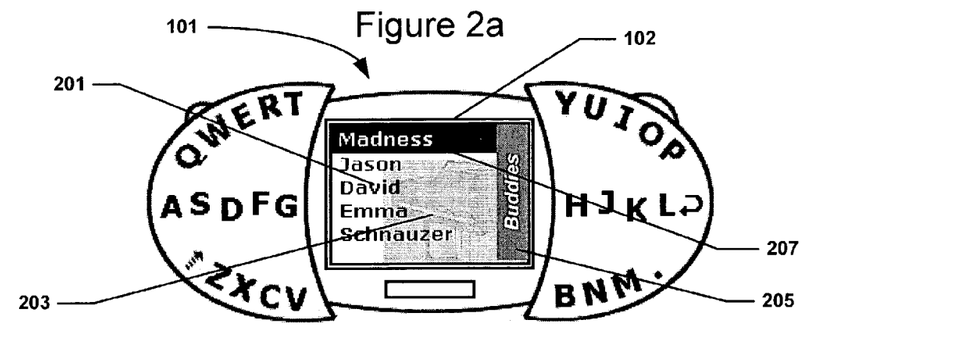
FIGS. 2a–2c are diagrams of a portable communication device running an instant messaging application with different themes applied, according to some embodiments of the present invention.
Figure 2B:
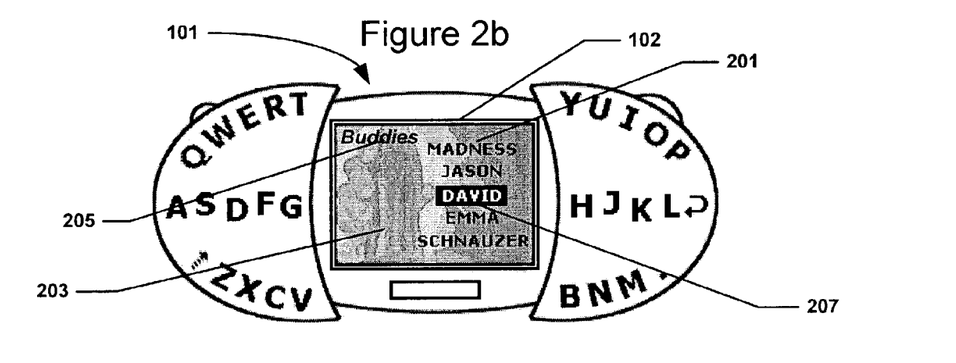
Figure 2C:
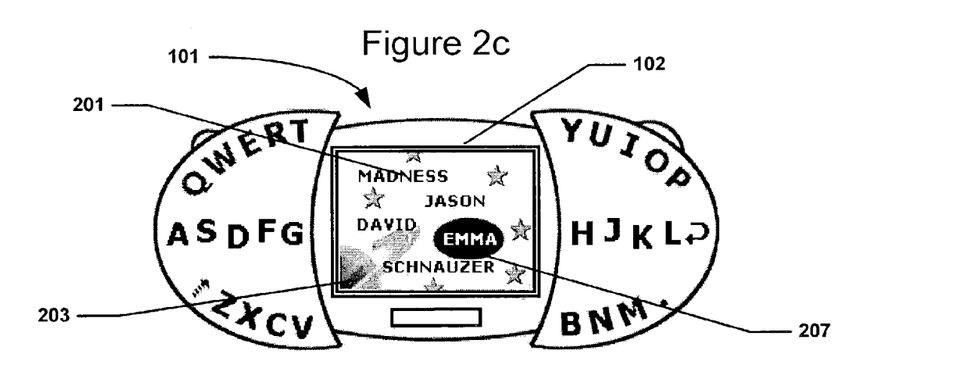

FIGS. 2a–2c are diagrams of the device 101 running an instant messaging application with different themes applied, according to one embodiment of the present invention. FIGS. 2a–2c illustrate how the user interface of the instant messaging application changes with the application of some sample themes. FIG. 2a illustrates a theme based upon Beethoven. The display 102 of the device 101 shows an instant messaging application with a buddy list 201 and a title 205. The selected name of the buddy list 201 is highlighted 207. The display 102 of the device 101 has a picture of one of Beethoven's pianofortes in the background 203.

FIG. 2b illustrates a theme based upon an advertisement for a soft drink. In this example, the display 102 of the device 101 has a picture of a soft drink in the background 203. The buddy list 201 is on the right; the title 205 is on the upper left of the display.

FIG. 2c illustrates a theme based on space. In this example, the display 102 of the device 101 has a picture of stars in the background 203. There is no title. The theme in FIG. 2c is notable because it changes the placement of the names in the buddy list 201 so that they are not displayed in a column. In addition, the space theme of FIG. 2c uses oval highlights 207 around the selected name in the buddy list 201, rather than rectangles.

The illustrated displays of the buddy list 201, the highlighting of the chosen name 207, and the title 205, are examples of the type of changes themes can make when applied to user interfaces. It is to be understood that a virtually limitless number of possibilities exist, both for theme topics themselves and for the specific changes to be made to a user interface. Specific theme topics and associated changes are design choices, all within the scope of the present invention. It is to be understood that the themes illustrated in FIGS. 2a–2c can be attenuated or amplified as desired, according to the present invention. The attenuation and amplification of themes are discussed in detail below.

Figure 2D:
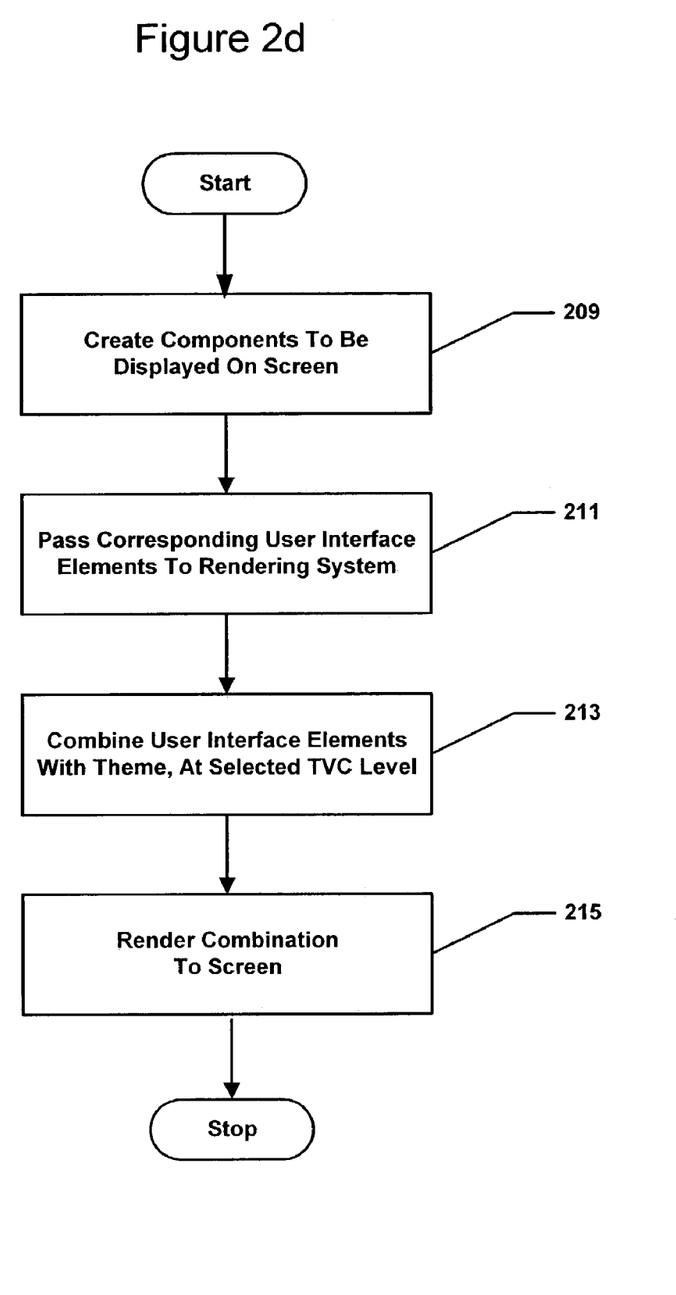
FIG. 2d is a flowchart illustrating steps for processing a user interface theme, according to one embodiment of the present invention.

FIG. 2d is a flowchart illustrating steps for processing a user interface theme according to one embodiment of the present invention. The instant messaging application illustrated in FIGS. 2a–2c creates 209 components to be displayed, such as a title 205, and a buddy list 201, including the current online status of each member of the list 201. The application then passes 211 user interface elements representing this data to the rendering system, for combination with the user interface theme. The rendering system proceeds to combine 213 the user interface elements with the theme, and renders 215 the resulting combination to the display 102.

The manner in which the rendering system combines 213 the user interface elements with the theme is a function of the TVC level. For example, if the TVC level is high, the title 205 may be presented as an animation where the texts zooms in from the center of the display 102 and continually hops about on the top of the display 102. The items in the buddy list 201 may each slide in from below and compress into each other as they come to a halt (an effect reminiscent of a lineup in old Keystone Cops movies). At a medium TVC level, the title 205 may animate more sedately, without continually wiggling once it comes to rest at the top of the display 102. At this level, the list 201 items could animate as one block instead of individually. At a lower TVC level, there could be no animation, but the items of the buddy list 201 could still be colorful. The lowest TVC level would generally result in no animation and a muted color palette. One of ordinary skill in the art will readily understand that the specific manner in which the user interface elements are combined with the theme at various TVC levels is a design choice. Numerous possibilities will be apparent to those of skill in the art, all of which are within the scope of the present invention.

Figure 2E:
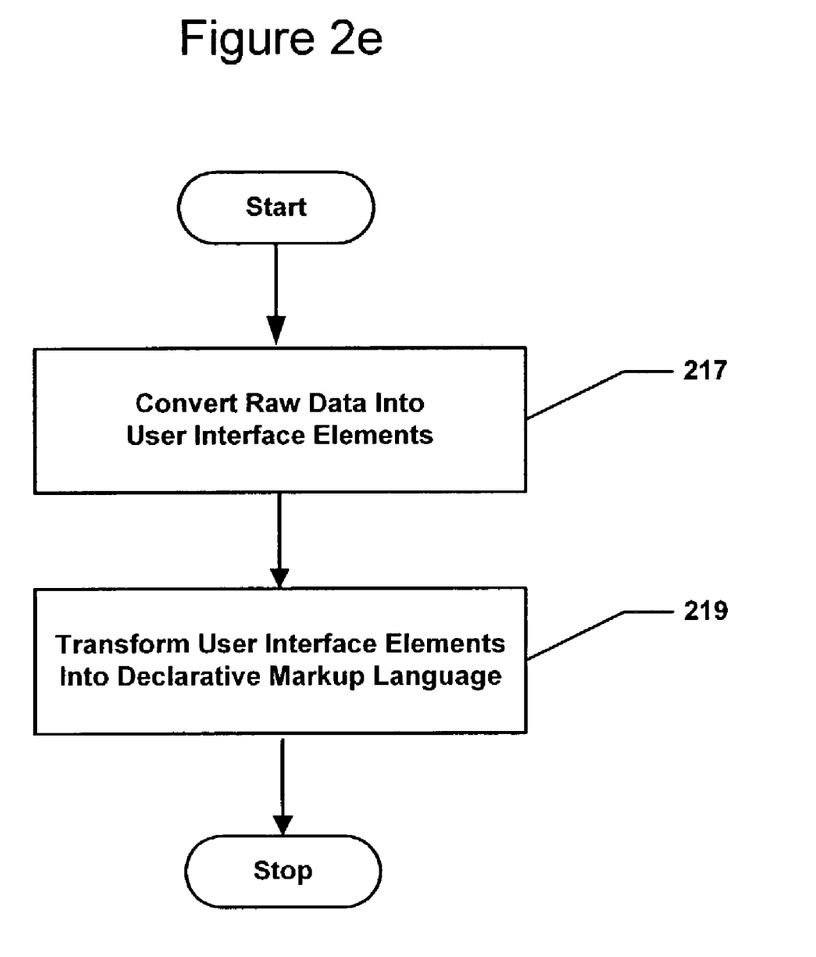
FIG. 2e is a flowchart illustrating steps for processing a user interface theme, according to another embodiment of the present invention.

In some embodiments of the present invention, both the application program and rendering system use XML and XSLT transforms to process the data. XML and XSLT transforms are known to those of ordinary skill in the relevant art, and are described, for example, in *Mastering XSLT,* by Chuck White, published in 2002 by Sybex, ISBN: 0782140947. Steps for processing the data according to one such embodiment are illustrated in FIG. 2e. The application program transforms 217 raw data into user interface elements. The rendering system transforms 219 user interface elements into a declarative markup language such as HTML, according to a theme and TVC level. In such an embodiment, a theme can be thought of as a set of transformations for all the user interface elements. Although XML, XSLT and HTML are discussed herein, these specific implementation formats serve as examples only. Other embodiments utilize other formats and markup languages, as desired.

TABLE 1 is an XML file listing illustrating the application data used by an instant messaging application, according to one embodiment of the invention. XML is a known file format documented in books such as *XML in a Nutshell,*

*2nd Edition,* by Jennifer Niederst, published in 2001 by O'Reilly & Associates, ISBN 0596001967. In TABLE 1, the instant messaging application is an instance of an <application> 1.01. The <application> 1.01 has fields such as application <name> 1.02 and <buddylist> 1.03. Each <buddy> 1.04 in the <buddylist>'1.03 has a <name> 1.05 and other personal data, such as an AOL Instant Messenger handle <aim> 1.06, associated with it. Of course, these fields serve as examples only. It is to be understood that in various embodiments of the device 101 other fields can be used, as desired.

TABLE 1

| | |
|---|---|
| 1.01 | <application> |
| 1.02 | <name>Buddies</name> |
| 1.03 | <buddylist> |
| 1.04 | <buddy> |
| 1.05 | <name>Madness</name> |
| 1.06 | <aim>madness@aol.com</aim> |
| 1.07 | </buddy> |
| 1.08 | <buddy> |
| 1.09 | <name>David</name> |
| 1.10 | <name>david7865@aol.com</aim> |
| 1.11 | </buddy> |
| 1.12 | <buddy> |
| 1.13 | <name>Jason</name> |
| 1.14 | <aim>xphile67@aol.com</aim> |
| 1.15 | </buddy> |
| 1.16 | <buddy> |
| 1.17 | <name>Emma</name> |
| 1.18 | <aim>etc56748@aol.com</aim> |
| 1.19 | </buddy> |
| 1.20 | <buddy> |
| 1.21 | <name>Schnauzer</name> |
| 1.22 | <aim>schnauzer42logic@aol.com<aim> |
| 1.23 | </buddy> |
| 1.24 | </buddylist> |
| 1.25 | </application> |

TABLE 2 is an XSLT style sheet illustrating the process that can be used to convert 217 application data into user interface elements, according to one embodiment of the invention. Application data are objects managed by the application program, such as names, addresses, part numbers, or delivery dates. User interface elements are used to create screen displays such as titles, text fields, menus, images, captions, or scrolling lists. XSLT is known file format documented in books such as *XSLT and XPath On The Edge, Unlimited Edition,* by Jeni Tennison, published in 2001 by John Wiley & Sons, ISBN 0764547763. In TABLE 2, the application data are converted 217 into user interface elements following the instructions in this XLST style sheet. All of the transformations belong to one <screen> 2.06–2.14. The application <name> 1.02 is converted 217 into a <title> 2.07–2.09 and then each <buddy> 1.04 in a <buddylist> 1.03 is enumerated inside an <itemlist> 2.10–2.13. Each buddy's <name> 1.05 is converted 217 into an <entry> 2.19–2.21.

TABLE 2

| | |
|---|---|
| 2.01 | <?xml version="1.0" encoding="utf-8"?> |
| 2.02 | <xsl:stylesheet |
| | xmlns:xsl="http://www.w3.org/1999/XSL/Transform"> |
| 2.03 | |
| 2.04 | <xsl:output method="xml"/> |
| 2.05 | <xsl:template match="/"> |
| 2.06 | <screen> |
| 2.07 | <title> |
| 2.08 | <xsl:value-of select="application/name" /> |
| 2.09 | </title> |
| 2.10 | <itemlist> |

TABLE 2-continued

| | |
|---|---|
| 2.11 | <xsl:apply-templates select="application/buddylist/buddy"> |
| 2.12 | </xsl:apply-templates> |
| 2.13 | </itemlist> |
| 2.14 | </screen> |
| 2.15 | </xsl:template> |
| 2.16 | |
| 2.17 | |
| 2.18 | <xsl:template match="application/buddylist/buddy"> |
| 2.19 | <entry> |
| 2.20 | <xsl:value-of select="name" /> |
| 2.21 | </entry> |
| 2.22 | </xsl:template> |
| 2.23 | |
| 2.24 | </xsl:stylesheet> |

TABLE 3 is an XML file listing illustrating a set of user interface elements created by the conversion 217 of application data by the XLST file listing in TABLE 2. For example, in TABLE 3, the application <name> 1.02 is now the <title> 3.02. The <buddylist> 1.03 is now a generic <itemlist> 3.03 that contains each buddy's <name> 1.05 as an <entry> 3.04. Of course, these fields serve as examples only. It is to be understood that in various embodiments of the invention other fields can be used, as desired.

TABLE 3

| | |
|---|---|
| 3.01 | <screen> |
| 3.02 | <title>Buddies</title> |
| 3.03 | <itemlist> |
| 3.04 | <entry>Madness</entry> |
| 3.05 | <entry>David</entry> |
| 3.06 | <entry>Jason</entry> |
| 3.07 | <entry>Emma</entry> |
| 3.08 | <entry>Schnauzer</entry> |
| 3.09 | </itemlist> |
| 3.10 | </screen> |

TABLE 4 is an XSLT style sheet illustrating the process that can be used to transform 219 the user interface elements into a screen display, according to one embodiment of the invention. In this embodiment, HTML is the screen rendering technology. HTML is a known markup language and is widely documented in books such as *HTML for the World Wide Web with XHTML and CSS: Visual QuickStart Guide, Fifth Edition,* by Elizabeth Castro, published in 2002 by Peachpit Press, ISBN 0321130073. The style sheet is processed to transform 219 the user interface elements into HTML 4.05–4.12. The style sheet enumerates all objects that are children of the <screen> object 4.09. If there is a <title> object 4.14–4.19 present, then it is rendered in HTML. If there isn't a <title> object 4.14–4.19 present, then this template is skipped. Similarly, if there is an <itemlist> 4.20–4.24, then it is transformed 219 into an HTML table 4.21–4.23. Finally, each item in the <itemlist> 4.25–4.31 is transformed 219 into a row in the HTML table 4.26–4.30. This XSLT style sheet is only part of a collection of XSLT style sheets that together comprise a theme.

TABLE 4

| | |
|---|---|
| 4.01 | <?xml version="1.0" encoding="utf-8"?> |
| 4.02 | <xsl:stylesheet |
| | xmlns:xsl="http://www.w3.org/1999/XSL/Transform"> |
| 4.03 | <xsl:output method="html"/> |
| 4.04 | <xsl:template match="/"> |
| 4.05 | <HTML> |
| 4.06 | <BODY> |
| 4.07 | <div style="position:absolute; top: 0; left: 0; width:132; |

TABLE 4-continued

| | |
|---|---|
| 4.08 | height: 96; background: silver; font-family: verdana; "> |
| 4.09 | <xsl:apply-templates /> |
| 4.10 | </div> |
| 4.11 | </BODY> |
| 4.12 | </HTML> |
| 4.13 | </xsl:template> |
| 4.14 | <xsl:template match="screen/title"> |
| 4.15 | <div style="position: absolute; top: 0; left: 112; width:96; height: 20; |
| 4.16 | background: gray;color: white; filter:progid: DXImageTransform.Microsoft.BasicImage(rotation=3)"> |
| 4.17 | <center><xsl:value-of select="/screen/title" /></center> |
| 4.18 | </div> |
| 4.19 | </xsl:template> |
| 4.20 | <xsl:template match="itemlist"> |
| 4.21 | <TABLE style="font-family: verdana; font-size: 9pt; "> |
| 4.22 | <xsl:apply-templates /> |
| 4.23 | </TABLE> |
| 4.24 | </xsl:template> |
| 4.25 | <xsl:template match="entry"> |
| 4.26 | <TR> |
| 4.27 | <TD> |
| 4.28 | <xsl:apply-templates /> |
| 4.29 | </TD> |
| 4.30 | </TR> |
| 4.31 | </xsl:template> |
| 4.32 | </xsl:stylesheet> |

Figure 3:
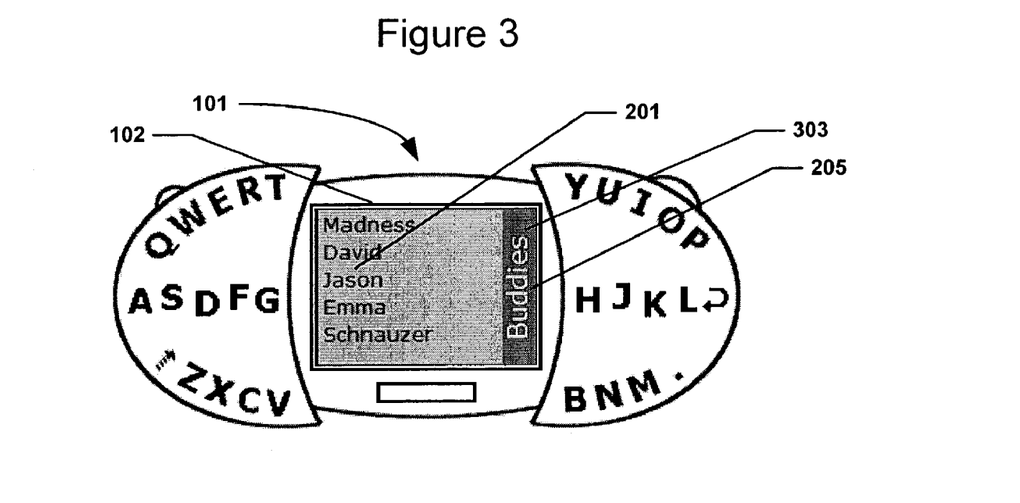
FIG. 3 is a diagram of a portable communication device with a first theme applied, according to one embodiment of the present invention.

FIG. 3 is a diagram of a portable communication device 101, with a theme applied, according to one embodiment of the present invention. The display 102 shows the output from an instant messaging application, as derived from the applied theme's XSLT style sheet shown in TABLE 4. The buddy list 201 and the title 205 have been rendered according to TABLE 4. Note that the title 205 is displayed as a vertical stripe 303.

TABLE 5 is an XSLT style sheet from a different theme that can be used as an alternative to the style sheet in TABLE 4.

TABLE 5

| | |
|---|---|
| 5.01 | <?xml version="1.0" encoding="utf-8"?> |
| 5.02 | <xsl:stylesheet xmlns:xsl="http://www.w3.org/1999/XSL/Transform"> |
| 5.03 | <xsl:output method="html"/> |
| 5.04 | <xsl:template match="/"> |
| 5.05 | <HTML> |
| 5.06 | <BODY> |
| 5.07 | <div style="position: absolute; top: 0;left: 0;width: 132;height: 96; |
| 5.08 | background: silver; font-family: 'comic sans ms'; "> |
| 5.09 | <xsl:apply-templates /> |
| 5.10 | </div> |
| 5.11 | </BODY> |
| 5.12 | </HTML> |
| 5.13 | </xsl:template> |
| 5.14 | <xsl:template match="screen/title"> |
| 5.15 | |
| 5.16 | |
| 5.17 | <center><b><xsl:value-of select="/screen/title" /></b></center> |
| 5.18 | |
| 5.19 | </xsl:template> |
| 5.20 | <xsl:template match="itemlist"> |
| 5.21 | <TABLE style="font-family: 'comic sans ms'; line-height: 9pt;"> |
| 5.22 | <xsl:apply-templates /> |
| 5.23 | </TABLE> |
| 5.24 | </xsl:template> |
| 5.25 | <xsl:template match="entry"> |
| 5.26 | <TR> |
| 5.27 | <TD> |
| 5.28 | <xsl:apply-templates /> |
| 5.29 | </TD> |
| 5.30 | </TR> |
| 5.31 | </xsl:template> |
| 5.32 | </xsl:stylesheet> |

Figure 4:
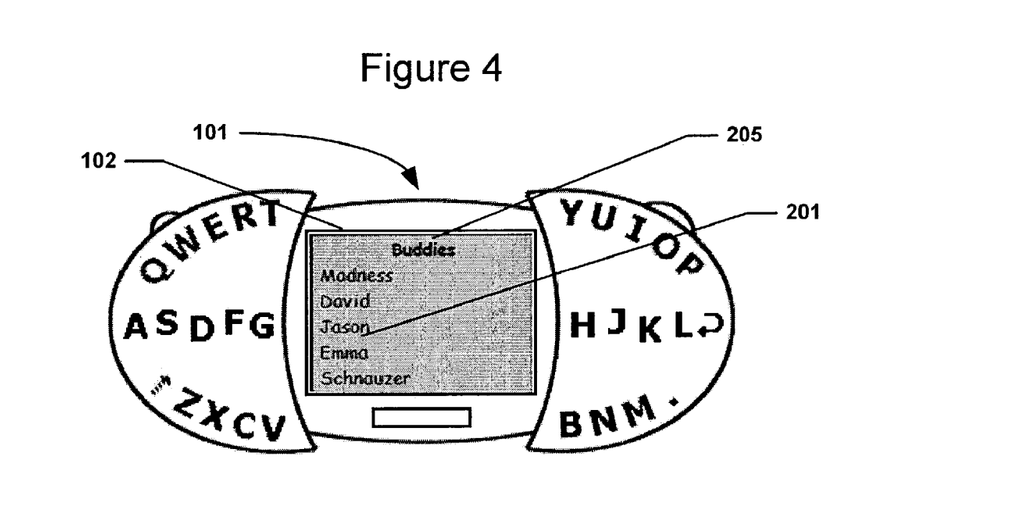
FIG. 4 is a diagram of a portable communication device with a second theme applied, according to one embodiment of the present invention.

FIG. 4 illustrates a display 102 on a portable communication device 101 with a theme applied as per TABLE 5. Since the XSLT style sheet TABLE 5 is a different theme, the display 102 is appropriately different. For instance, the title <205> is now displayed at the top of the screen instead of rotated to the right as in FIG. 3.

Figure 5A:
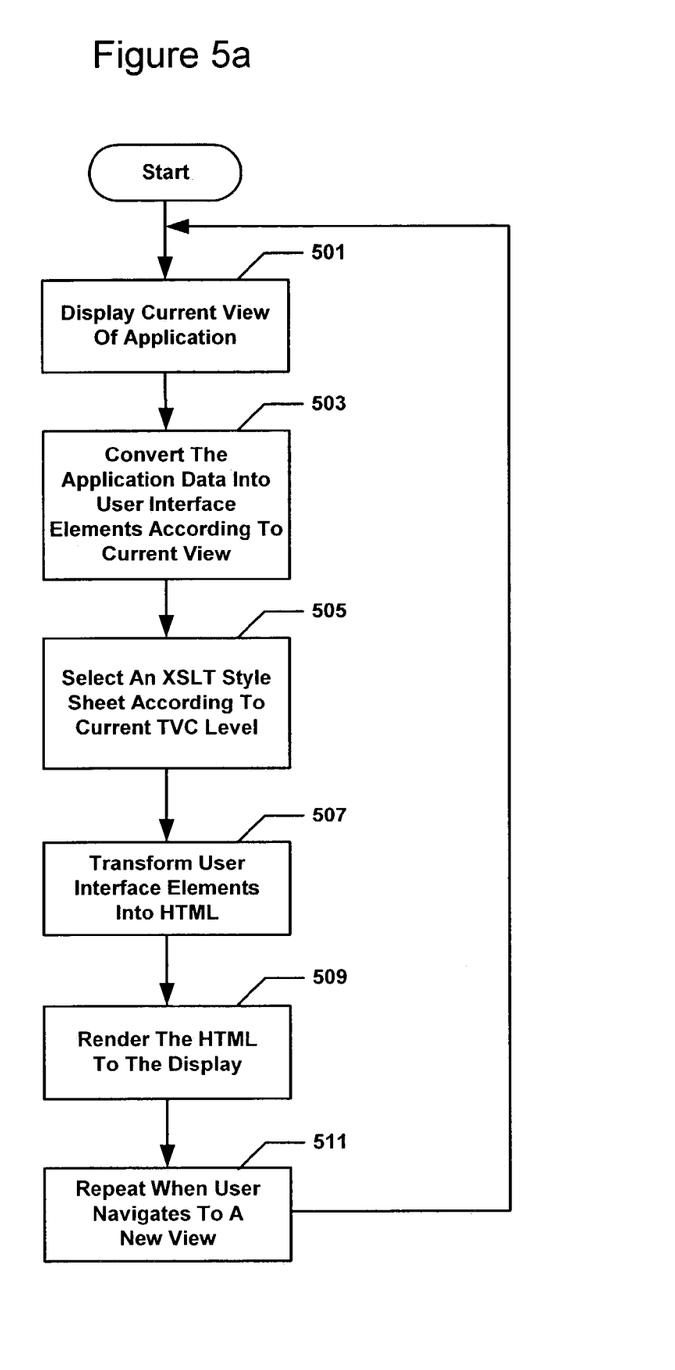
FIG. 5a is a flowchart illustrating steps for creating a screen display, according to one embodiment of the present invention.

FIG. 5a is a flowchart illustrating the overall operating sequence to create a screen display, according to one embodiment of the present invention. When the device 101 is turned on, an application is run and its current view is displayed 501. The application data is converted 503 into user interface elements, according to the current view. The current Theme Volume Control (TVC) level is used to select 505 an XSLT style sheet from the current theme. In this embodiment, a theme consists of a set of XSLT style sheets that are accessed according to the current TVC level. For example, for a TVC with a scale of 1–10, there would be ten style sheets, each one corresponding to a different possible TVC level. The elements for the user interface are transformed 507 into HTML. The HTML is then rendered 509 to the display. The process repeats 511 whenever the user navigates to a new view.

Figure 5B:
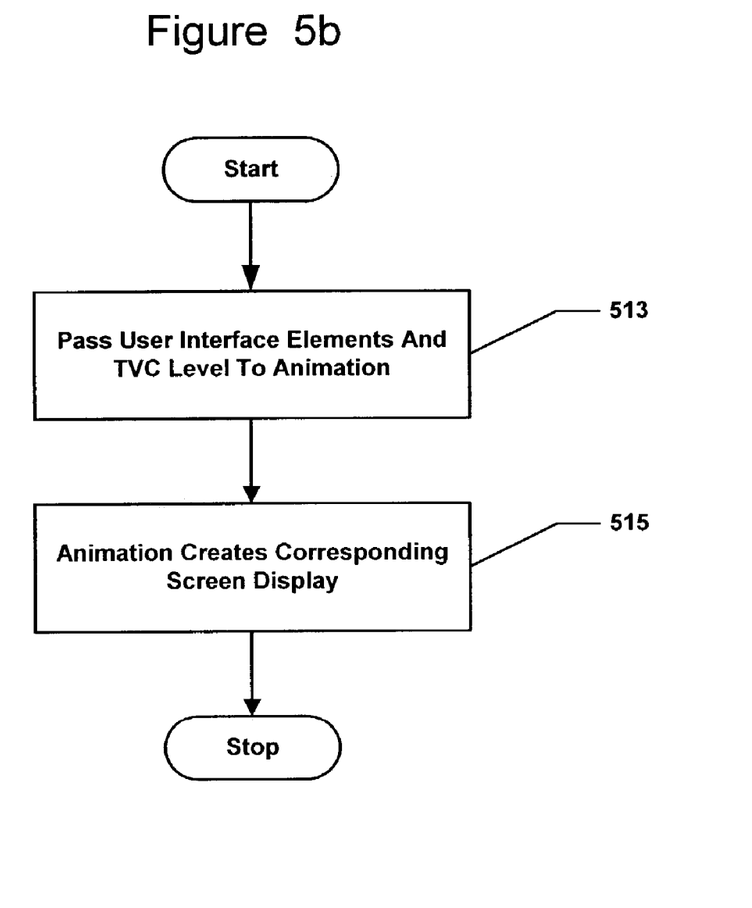
FIG. 5b is a flowchart illustrating steps for creating a screen display, according to another embodiment of the present invention.

In other embodiments of the present invention, the rendering system uses Flash animations instead of HTML to render the display. FIG. 5b is a flowchart illustrating creation of a screen display, according to one such embodiment. Flash, from Macromedia, Inc., is documented in books such as *Macromedia Flash MX: Training from the Source,* by Chrissy Rey, published in 2002 by Macromedia Press, ISBN 0201794829. In embodiments that use Flash animations, the user interface elements and the TVC level are passed 513 as parameters to animations. The animations proceed to create 515 screen displays that correspond to the user interface elements and TVC level. Of course, Flash animations are only an example of an animation format that can be used within the context of the present invention. Formats from other content authoring software tools with support for animations are utilized in other embodiments, as desired.

TABLE 6 is an XSLT style sheet used in another embodiment of the present invention. In TABLE 6 there are conditional statements 6.02, 6.07, 6.12, 6.17, and 6.22 that can select different XSL statements according to the current TVC level, which in this embodiment, range from 1–6. The HTML generated from the XSLT style sheet ranges in complexity from simple text 6.03–6.05 to an instance of a Flash animation 6.23–6.30.

TABLE 6

| | |
|---|---|
| 6.01 | <xsl:template match="screen/title"> |
| 6.02 | <xsl:if UIVC__Level = > |
| 6.03 | <center><b> |
| 6.04 | <xsl:value-of select="/screen/title" /> |
| 6.05 | </b></center> |
| 6.06 | </xsl:if> |
| 6.07 | <xsl:if UIVC__Level = 2> |
| 6.08 | <font color="gray"><center><b> |
| 6.09 | <xsl:value-of select="/screen/title" /> |
| 6.10 | </b></center></font> |
| 6.11 | </xsl:if> |
| 6.12 | <xsl:if UIVC__Level = 3> |
| 6.13 | <font color="red"><center><b> |

TABLE 6-continued

| | |
|---|---|
| 6.14 | `<xsl:value-of select="/screen/title" />` |
| 6.15 | `</b></center></font>` |
| 6.16 | `</xsl:if>` |
| 6.17 | `<xsl:if UIVC__Level=4>` |
| 6.18 | `<span style="background:yellow;"><font color="red">` |
| | `<center><b>` |
| 6.19 | `<xsl:value-of select="/screen/title" />` |
| 6.20 | `</b></center></font></span>` |
| 6.21 | `</xsl:if>` |
| 6.22 | `<xsl:if UIVC__Level = 5>` |
| 6.23 | `<OBJECT` |
| | `classid="clsid:D27CDB6E-AE6D-11 cf-96B8-444553540000"` |
| 6.24 | `codebase="http://download.macromedia.com/pub/shockwave/` |
| 6.25 | `cabs/flash/swflash.cab#version=5,0,0,0"` |
| 6.26 | `WIDTH=100 HEIGHT=20>` |
| 6.27 | `<PARAM NAME=movie VALUE="titleAnimate.swf">` |
| 6.28 | `<PARAM NAME=quality VALUE=high>` |
| 6.29 | `<PARAM NAME=bgcolor VALUE=#FFFFFF>` |
| 6.30 | `<PARAM NAME=title VALUE=` |
| | `"<xsl:value-of select="/screen/title" />">` |
| 6.31 | `</OBJECT>` |
| 6.32 | `</xsl:if>` |
| 6.33 | `</xsl:template>` |

Figure 6A:
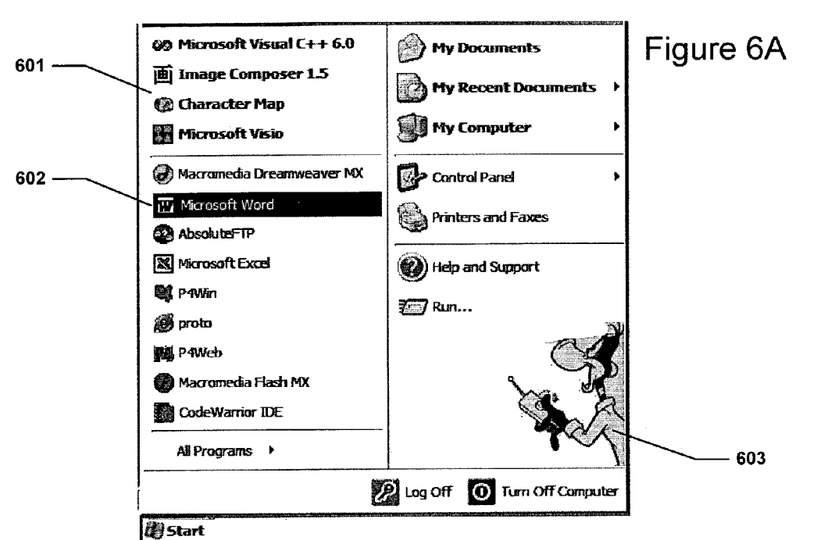
FIGS. 6a–6b are diagrams of a Start Menu of a personal computer with an animated theme applied, according to one embodiment of the present invention.
Figure 6B:
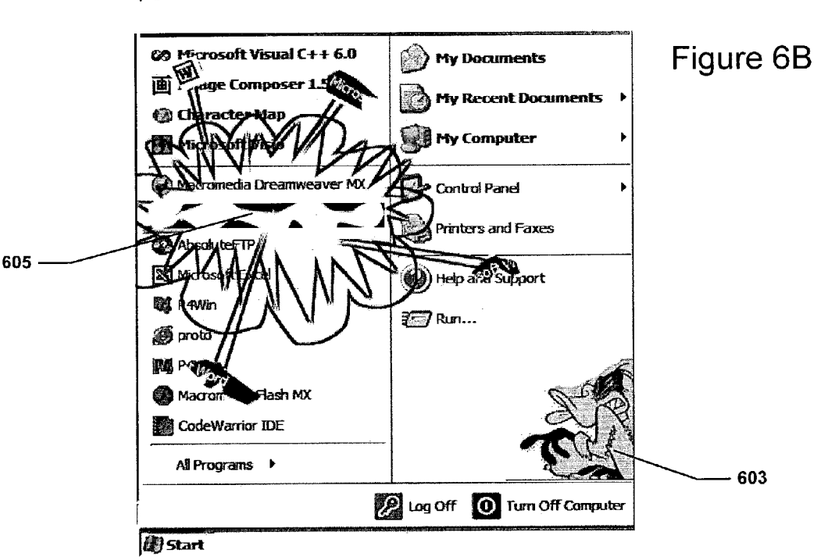

FIGS. 6a–b are diagrams illustrating a Start Menu 601 for a personal computer with a theme applied, according to one embodiment of the present invention. Although FIGS. 6a–b illustrate a Start Menu 601 for a personal computer (such as a laptop or desktop), the illustrated functionality can also be applied on portable or other computing devices 101. In the illustrated embodiment, if the TVC level is high, small animations are inserted into the standard user interface elements. FIGS. 6a–b illustrate two frames of animation that occur when the user chooses an item from the Start Menu 601. As illustrated in FIG. 6a, when the user chooses the Microsoft Word® entry 602, an animated character 603 appears in the corner and pushes a detonator. As illustrated in FIG. 6b, an exploding menu item 605 is displayed and the animated character 603 reacts accordingly. If the TVC level is lower, then this animation would not occur. Of course, the illustrated animation is only one of many possible examples, all of which are within the scope of the present invention. It is to be understood that the animation frames illustrated in FIGS. 6a–6b can be attenuated or amplified as desired, according to the present invention.

Figure 7:
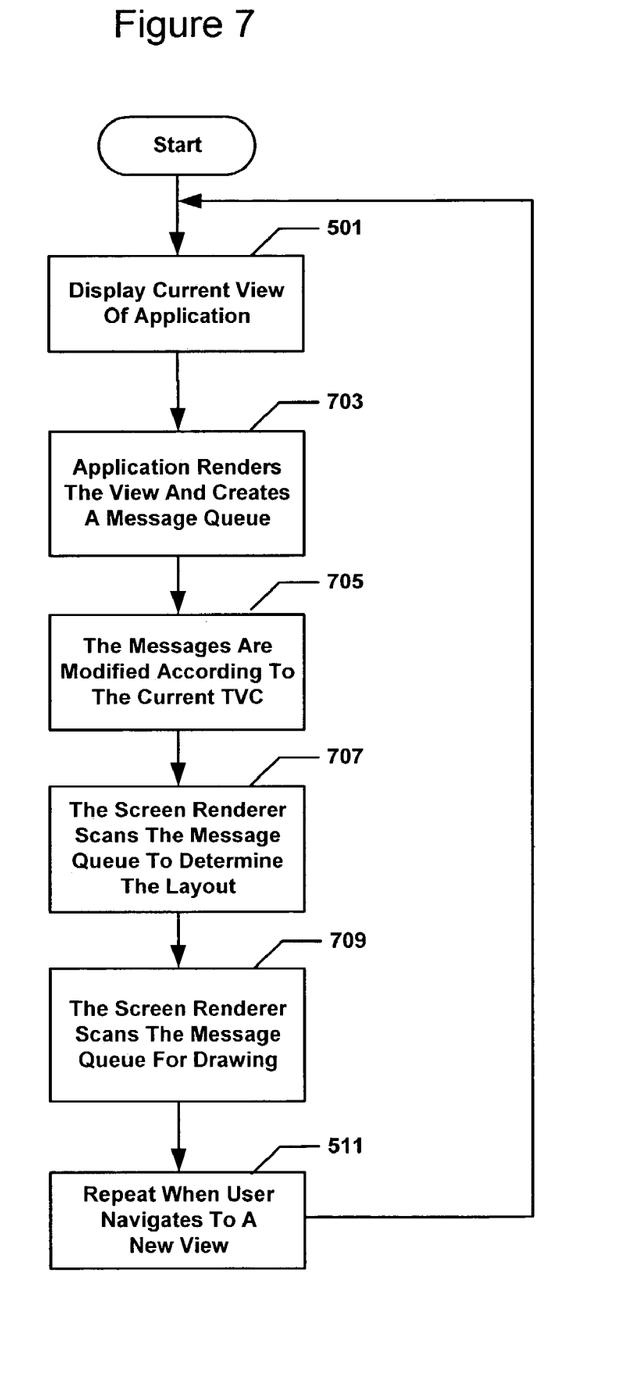
FIG. 7 is a flowchart illustrating steps for creating a screen display, according to another embodiment of the present invention.

FIG. 7 is a flowchart illustrating the overall operating sequence to create a screen display, according to another embodiment of the present invention. In this embodiment, the rendering of a theme at a TVC level is controlled by messages rather than an XSLT style sheet.

A personal computer application is run and its current view is displayed 501. The application calls routines for rendering the display. These routines create messages, which are data records containing the drawing instructions. Making a plurality of these calls in sequence creates 703 a queue of these messages. The current Theme Volume Control (TVC) level is used to modify the messages 705 by adjusting the colors, animations, and other message parameters. For example, all the messages can be scanned and a palette of their colors assembled. Depending on the TVC level, the color set can be made more saturated to amplify the theme or more muted to attenuate the theme. Such image processing techniques are discussed in books such as *Digital Image Processing* (2nd Edition), by Rafael C. Gonzalez and Richard E. Woods, published in 2002 by Addison-Wesley, ISBN 0201180758. Then, the messages are scanned and measured but not rendered, during a first pass to determine 707 the layout. A second pass actually renders 709 the messages to the display. The process repeats 511 whenever the user navigates to a new view.

It will be readily apparent to one of ordinary skill in the relevant art that the above described methodologies can be used to attenuate and/or amplify the degree to which a theme is applied to a user interface. By adjusting the TVC level, a user can cause the screen to be redrawn with user interface elements appropriate to the selected TVC level. Thus, by turning the TVC level up, the user can amplify the application of the theme, and by turning the TVC level down, the user can attenuate the application of the theme.

As will be understood by those familiar with the art, the invention may be embodied in other specific forms without departing from the spirit or essential characteristics thereof. Likewise, the particular naming and division of the modules, features, attributes, methodologies, and other aspects are not mandatory or significant, and the mechanisms that implement the invention or its features may have different names, divisions and/or formats. Furthermore, as will be apparent to one of ordinary skill in the relevant art, the modules, features, attributes, methodologies, and other aspects of the invention can be implemented as software, hardware, firmware, or any combination of the three. Of course, wherever a component of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of skill in the art of computer programming. Additionally, the present invention is in no way limited to implementation in any specific programming language or for any specific operating system or environment. Accordingly, the disclosure of the present invention is intended to be illustrative, but not limiting, of the scope of the invention, which is set forth in the following claims.

What is claimed is:

1. A computer implemented method for modifying a degree to which a theme is applied to a graphical computer operating environment, the method comprising:
    displaying multiple, separate elements of the graphical computer operating environment according to an applied theme and a theme intensity level specified by a user, such that the theme intensity level regulates an intensity of audiovisual stimulation and distraction generated solely by the theme;
    receiving a single new theme intensity level from the user, the received theme intensity level specifying a new intensity of audiovisual stimulation and distraction, and being distinct from the displayed elements; and
    responsive only to the receipt of the single new theme intensity level from the user, automatically and without further user input, adjusting the theme intensity level at which multiple, separate elements of the graphical computer operating environment are displayed, according to the received theme intensity level with its specified intensity of audiovisual stimulation and distraction, without switching the applied theme.

2. The method of claim 1 further comprising:
    attenuating the application of the theme to the user interface, responsive to receiving a lower theme intensity level.

3. The method of claim 2 wherein attenuating the application of the theme to the user interface further comprises:
    slowing down at least one animation.

4. The method of claim 2 wherein attenuating the application of the theme to the user interface further comprises:
replacing at least one animation with at least one non-animated graphic.

5. The method of claim 2 wherein attenuating the application of the theme to the user interface further comprises:
replacing at least one animation with at least one less distracting animation.

6. The method of claim 2 wherein attenuating the application of the theme to the user interface further comprises:
decreasing color intensity.

7. The method of claim 2 wherein attenuating the application of the theme to the user interface further comprises:
decreasing an output volume for sound effects.

8. The method of claim 2 wherein attenuating the application of the theme to the user interface further comprises:
replacing an applied theme with a less distracting theme.

9. The method of claim 1 further comprising:
amplifying the application of the theme to the user interface, responsive to receiving a higher theme intensity level.

10. The method of claim 9 wherein amplifying the application of the theme to the user interface further comprises:
speeding up at least one animation.

11. The method of claim 9 wherein amplifying the application of the theme to the user interface further comprises:
replacing at least one non-animated graphic with at least one animation.

12. The method of claim 9 wherein amplifying the application of the theme to the user interface further comprises:
replacing at least one animation with at least one more distracting animation.

13. The method of claim 9 wherein amplifying the application of the theme to the user interface further comprises:
increasing color intensity.

14. The method of claim 9 wherein amplifying the application of the theme to the user interface further comprises:
increasing an output volume for sound effects.

15. The method of claim 9 wherein amplifying the application of the theme to the user interface further comprises:
replacing an applied theme with a more distracting theme.

16. The method of claim 1 wherein displaying elements of the graphical computer operating environment further comprises:
selecting a style sheet according the theme intensity level;
transforming the elements of the graphical computer operating environment into markup language according to the style sheet; and
rendering the markup language.

17. The method of claim 1 wherein displaying elements of the graphical computer operating environment further comprises:
passing the elements of the graphical computer operating environment and the theme intensity level to an animation; and
creating, by the animation, a screen display according to the elements of the graphical computer operating environment and the theme intensity level.

18. The method of claim 1 wherein displaying elements of the graphical computer operating environment further comprises:
storing messages created by screen drawing routines in a queue;
modifying messages in the queue, according to the theme intensity level; and
rendering the modified messages.

19. A computer program product for modifying a degree to which a theme is applied to a graphical computer operating environment, the computer program product comprising:
program code for displaying multiple, separate elements of the graphical computer operating environment according to an applied theme and a theme intensity level specified by a user, such that the theme intensity level regulates an intensity of audiovisual stimulation and distraction generated solely by the theme;
program code for receiving a single new theme intensity level from the user, the received theme intensity level specifying a new intensity of audiovisual stimulation and distraction and being distinct from the displayed elements;
program code for, responsive only to the receipt of the single new theme intensity level from the user, automatically and without further user input, adjusting the theme intensity level at which multiple, separate elements of the graphical computer operating environment are displayed, according to the received theme intensity level with its specified intensity of audiovisual stimulation and distraction, without switching the applied theme; and
a computer readable medium on which the program codes are stored.

20. The computer program product of claim 19 further comprising:
program code for attenuating the application of the theme to the user interface, responsive to receiving a lower theme intensity level.

21. The computer program product of claim 19 further comprising:
program code for amplifying the application of the theme to the user interface, responsive to receiving a higher theme intensity level.

22. The computer program product of claim 19 wherein the program code for displaying elements of the graphical computer operating environment further comprises:
program code for selecting a style sheet according to the theme intensity level;
program code for transforming the elements of the graphical computer operating environment into markup language according to the style sheet; and
program code for rendering the markup language.

23. The computer program product of claim 19 wherein the program code for displaying elements of the graphical computer operating environment further comprises:
program code for passing the elements of the graphical computer operating environment and the theme intensity level to an animation; and
program code for creating, by the animation, a screen display according to the elements of the graphical computer operating environment and the theme intensity level.

24. The computer program product of claim 19 wherein the program code for displaying elements of the graphical computer operating environment further comprises:
program code for storing messages created by screen drawing routines in a queue;
program code for modifying messages in the queue, according to the theme intensity level; and
program code for rendering the modified messages.

25. A computer system for modifying a degree to which a theme is applied to a graphical computer operating environment, the computer program product comprising:
- a software portion for displaying multiple, separate elements of the graphical computer operating environment according to an applied theme and a theme intensity level specified by a user, such that the theme intensity level regulates an intensity of audiovisual stimulation and distraction generated solely by the theme;
- a software portion for receiving a single new theme intensity level from the user, the received theme intensity level specifying a new intensity of audiovisual stimulation and distraction, and being distinct from the displayed elements; and
- a software portion for, responsive only to the receipt of the single new theme intensity level from the user, automatically and without further user input, adjusting the theme intensity level at which multiple, separate elements of the graphical computer operating environment are displayed, according to the received theme intensity level with its specified intensity of audiovisual stimulation and distraction, without switching the applied theme.

26. The computer system of claim 25 further comprising:
a software portion for attenuating the application of the theme to the user interface, responsive to receiving a lower theme intensity level.

27. The computer system of claim 25 further comprising:
a software portion for amplifying the application of the theme to the user interface, responsive to receiving a higher theme intensity level.

28. The computer system of claim 25 wherein the software portion for displaying elements of the graphical computer operating environment further comprises:
- a software portion for selecting a style sheet according to the theme intensity level;
- a software portion for transforming the elements of the graphical computer operating environment into markup language according to the style sheet; and
- a software portion for rendering the markup language.

29. The computer system of claim 25 wherein the software portion for displaying elements of the graphical computer operating environment further comprises:
- a software portion for passing the elements of the graphical computer operating environment and the theme intensity level to an animation; and
- a software portion for creating, by the animation, a screen display according to the elements of the graphical computer operating environment and the theme intensity level.

30. The computer system of claim 25 wherein the software portion for displaying elements of the graphical computer operating environment further comprises:
- a software portion for storing messages created by screen drawing routines in a queue;
- a software portion for modifying messages in the queue, according to the theme intensity level; and
- a software portion for rendering the modified messages.

* * * * *

UNITED STATES PATENT AND TRADEMARK OFFICE
CERTIFICATE OF CORRECTION

| | | |
|---|---|---|
| PATENT NO. | : 7,017,117 B2 | Page 1 of 1 |
| APPLICATION NO. | : 10/367451 | |
| DATED | : March 21, 2006 | |
| INVENTOR(S) | : Stephen P. Capps | |

It is certified that error appears in the above-identified patent and that said Letters Patent is hereby corrected as shown below:

Page 1, Front Page, [75] Inventor:, replace "Stephen P Capps" with - - - "Stephen P. Capps"

Column 8, Table 6, Line 6.02, ADD: 1
Line to read as: <xsl:if UIVC_Level = 1>

Column 9, Table 6, Line 6.23, REMOVE: space between "11" and "cf..."
Line to read as:   classid-"clsid:D27CDB6E-AE6D-11cf-96B8-444553540000"

Signed and Sealed this

First Day of August, 2006

JON W. DUDAS
*Director of the United States Patent and Trademark Office*

UNITED STATES PATENT AND TRADEMARK OFFICE
CERTIFICATE OF CORRECTION

PATENT NO.       : 7,017,117 B2                                        Page 1 of 1
APPLICATION NO.  : 10/367451
DATED            : March 21, 2006
INVENTOR(S)      : Stephen P. Capps It is certified that error appears in the above-identified patent and that said Letters Patent is hereby corrected as shown below:

* Column 5, Table 1, 1.10, <name>david7865@aol.com</aim> should read

<aim>david7865@aol.com</aim>

* Column 5 Table 2, 2.04, <xsl:output method="xml"/> add space at the end of the line before /> it should be <xsl:output method="xml" />

* Columns 5 and 6 Table 2, 2.09 thru 2.13, need to indent to the right

* Column 6, line 17, 1st sentence: "TABLE 3 is an XML file listing...data by the XLST ..." should read "TABLE 3 is an XML file listing...data by the XSLT..."

* Column 6 Table 4, 4.03, <xsl:output method="html"/> add space at the end of the line before /> it should be <xsl:output method="html" />

* Column 7 Table 5, 5.03, <xsl:output method="html"/> add space at the end of the line before /> it should be <xsl:output method="html" />

* Column 9 Table 6, 6.17, <xsl:if UIVC_Level=4> add space after equal sign before number 4 it should be <xsl:if UIVC_Level= 4>

Signed and Sealed this

Second Day of January, 2007

JON W. DUDAS
*Director of the United States Patent and Trademark Office*

UNITED STATES PATENT AND TRADEMARK OFFICE
CERTIFICATE OF CORRECTION

PATENT NO. : 7,017,117 B2  Page 1 of 1
APPLICATION NO. : 10/367451
DATED : March 21, 2006
INVENTOR(S) : Stephen P. Capps It is certified that error appears in the above-identified patent and that said Letters Patent is hereby corrected as shown below:

Front Page, [73] Assignee:

Replace "Symantec Corporation, Cupertino, CA (US)"

with -- ONEDOTO, San Carlos, CA (US) --

Signed and Sealed this

Twenty-first Day of April, 2009

JOHN DOLL
*Acting Director of the United States Patent and Trademark Office*